United States Patent Office 2,824,103
Patented Feb. 18, 1958

2,824,103
NEW 1,3,5-TRIAZINES

Albrecht Hueni and Alexander Staehelin, Basel, Switzerland, assignors to Ciba Pharmaceutical Products Inc., Summit, N. J.

No Drawing. Application August 30, 1956
Serial No. 606,978

Claims priority, application Switzerland
September 27, 1955

5 Claims. (Cl. 260—249.6)

This invention relates to new 1,3,5-triazines, and more particularly to 2-hydrazino-4:6-bis-diethylamino-1,3,5-triazine of the formula

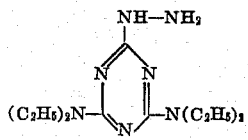

and salts thereof.

The above compound and its salts possess valuable pharmacological properties. Thus, they possess an inhibiting action on the transmission of stimulae in the central nervous system, and are therefore useful as medicaments in neurological diseases.

The new 1,3,5-triazine compound is obtained in accordance with the invention by reacting 2-chloro-4,6-bis-diethylamino-1,3,5-triazine with hydrazine. In a preferred and specific embodiment of the invention, the reaction is carried out in ethanolic solution, and the 2-hydrazino-4,6-bis-diethylamino-1,3,5-triazine is obtained by extraction of the evaporated reaction mixture which dilute hydrochloric acid, rendering the solution alkaline with caustic soda solution and subsequent ether extraction followed by a second hydrochloric acid-extraction, alkalization and ether extraction.

Depending on the procedure used the new hydrazino-triazine is obtained in the form of the base or a salt thereof. From the base therapeutically useful acid addition salts may be prepared, such as salts of hydrohalic acids, sulphuric acid, nitric acid, phosphoric acid, acetic acid, propionic acid, oxalic acid, malic acid, citric acid, methane acid, ethane sulphonic acid, oxyethane sulphonic acid, benzoic acid, salicylic acid; para-aminosalicylic acid or toulene sulphonic acid, any salts obtained can be converted into the free base in the usual manner. The new compound and its salts can be used as medicaments, for example, in the form of pharmaceutical preparations, which contain the compound or a salt thereof in admixture with a pharmaceutical organic or inorganic solid or liquid carrier suitable for enteral or parenteral administration. For making these preparations there are used substances which do not react with the new compound, for example, water, gelatine, lactose, starches, magnesium stearate, talc, vegetable oils, benzyl alcohols, gums, polyalkylene glycols, petroleum jelly, cholesterol or another carrier known for medicaments.

The pharmaceutical preparations may be made up, for example, as tablets or dragees or in liquid form as solutions, suspensions or emulsions. If desired they may be sterilised and/or may contain auxiliary substances, such as preserving agents, stabilising agents, wetting agents or emulsifying agents, salts for regulating the osmotic pressure or buffers. They may also contain other therapeutically active substances. The preparations are made up by the usual methods.

The following examples illustrate the invention:

Example 1

983 grams of 2-chloro-4,6-bis-diethylamino-1,3,5-triazine are dissolved in 5000 cc of ethyl alcohol of 96 percent strength, and mixed with 1000 cc of hydrazine hydrate. After being allowed to stand at room temperature for 3 hours, the mixture is heated for a further 2 hours on a water bath. The solution is completely evaporated in vacuo, and the oily residue is dissolved in dilute hydrochloric acid, and the solution is rendered alkaline with caustic soda solution and then extracted several times with ether. The combined ethereal extracts are agitated with dilute hydrochloric acid, and the aqueous solution is rendered alkaline with caustic soda solution and extracted by agitation with ether. The organic phase is dried and completely evaporated. There is obtained 2-hydrazino-4,6-bis-diethylamino-1,3,5-triazine of the formula

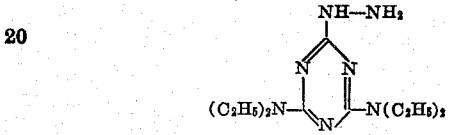

It is a colourless liquid, which crystallizes after prolonged standing and which can be converted by means of alcoholic hydrochloric acid and the addition of ether into the dihydrochloride of the formula

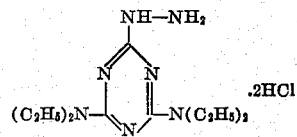

It melts at 198–200° C.

In a similar way, other therapeutically useful acid addition salts can be prepared, e. g. the nitrate, sulfate or phosphate.

Example 2

10 grams of 2-hydrazino-4,6-bis-diethylamino-1,3,5-triazine are dissolved in 80 cc. of absolute ether and slowly mixed with 3.8 grams of methane sulfonic acid, dissolved in 20 cc. of absolute ether. A white resin forms immediately which in the course of two days at room temperature transforms into a crystalline compound. The white residue is filtered with suction, washed with absolute ether, and recrystallized from a mixture of ethyl acetate and petroleum ether. There is thus obtained the 2-hydrazino-4,6-bis-diethylamino-1,3,5-triazine-monomethane sulfonate of the formula

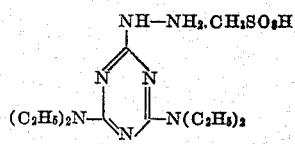

in the form of a white crystalline product melting at 97–99° C.

The ether filtrate yields as by-product some 2-hydrazino-4,6-bis-diethylamino-1,3,5-triazine-dimethane sulfonate of the formula

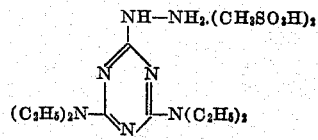

Its white crystals melt at 175–176° C.

What is claimed is:
1. A member selected from the group consisting of

2-hydrazino-4,6-bis-diethylamino-1,3,5-triazine and therapeutically useful acid addition salts thereof.
2. 2-hydrazino-4,6-bis-diethylamino-1,3,5-triazine.
3. 2 - hydrazino - 4,6 - bis - diethylamino - 1,3,5 - triazine-dihydrochloride.
4. 2 - hydrazino - 4,6-bis - diethylamino - 1,3,5 - triazine-monomethane sulfonate.

5. 2 - hydrazino - 4,6 - bis - diethylamino - 1,3,5 - triazine-dimethane sulfonate.

References Cited in the file of this patent
UNITED STATES PATENTS
2,328,958    D'Alelio et al. _____ Sept. 7, 1943